United States Patent
Chilman

[15] 3,638,421
[45] Feb. 1, 1972

[54] ENGINE INSTALLATIONS
[72] Inventor: John Alfred Chilman, Painswick, England
[73] Assignee: Dowty Rotal Limited, Gloucester, England
[22] Filed: Apr. 7, 1970
[21] Appl. No.: 26,214

[30] Foreign Application Priority Data
  May 3, 1969  Great Britain......................22,682/69

[52] U.S. Cl..............................60/39.31, 60/226, 244/54, 244/58
[51] Int. Cl........................................................F02c 7/20
[58] Field of Search....................60/39.31, 226; 244/54, 58, 244/60

[56] References Cited

UNITED STATES PATENTS

| | | | |
|---|---|---|---|
| 2,978,209 | 4/1961 | Kerry | 244/54 |
| 3,398,535 | 8/1968 | Campbell et al. | 60/226 |
| 366,125 | 7/1887 | Noyes | 74/665 GB |

*Primary Examiner*—Allan D. Herrmann
*Attorney*—Young & Thompson

[57] ABSTRACT

An engine installation including an engine, a hollow supporting strut connected to the engine and at least one accessory unit mounted within the hollow strut and drivable by power takeoff means from the engine.

9 Claims, 2 Drawing Figures

PATENTED FEB 1 1972  3,638,421

INVENTOR
JOHN ALFRED CHILMAN
BY
Young + Thompson
ATTORNEYS

ENGINE INSTALLATIONS

This invention relates to engine installations.

According to this invention an engine installation includes an engine, a hollow supporting strut connected to the engine and at least one accessory unit mounted within the hollow strut and drivable by power takeoff means from the engine.

Also, according to this invention an engine installation includes a main structure, an engine, a hollow supporting strut between said main structure and the engine, and at least one accessory unit mounted within the hollow strut and drivable by power takeoff means from the engine.

The power takeoff means may comprise shafting and gearing suitably mounted in bearings.

The engine may be a gas turbine engine of the bypass type. The bypass fan thereof may be of tiered form to provide at least two concentric annular flow paths and part of said shafting and gearing may be mounted in structure which in part defines the division between the two flow paths downstream of the tiered fan.

Such an engine installation can be employed in an aircraft, and the main structure may be either the wing of the aircraft, or alternatively, the fuselage of the aircraft.

The hollow strut may taper towards the engine and where a plurality of accessory units of differing sizes are mounted in the hollow strut they may be disposed in physically parallel manner with their sizes in ascending order in a direction away from the engine.

Also according to the invention there is provided, for the support of an engine by a main structure, a hollow strut, capable of being connected between the main structure and the engine, having at least one accessory unit mounted within it which is drivable by power takeoff means connectable to the rotary system of the engine.

Figure 1:
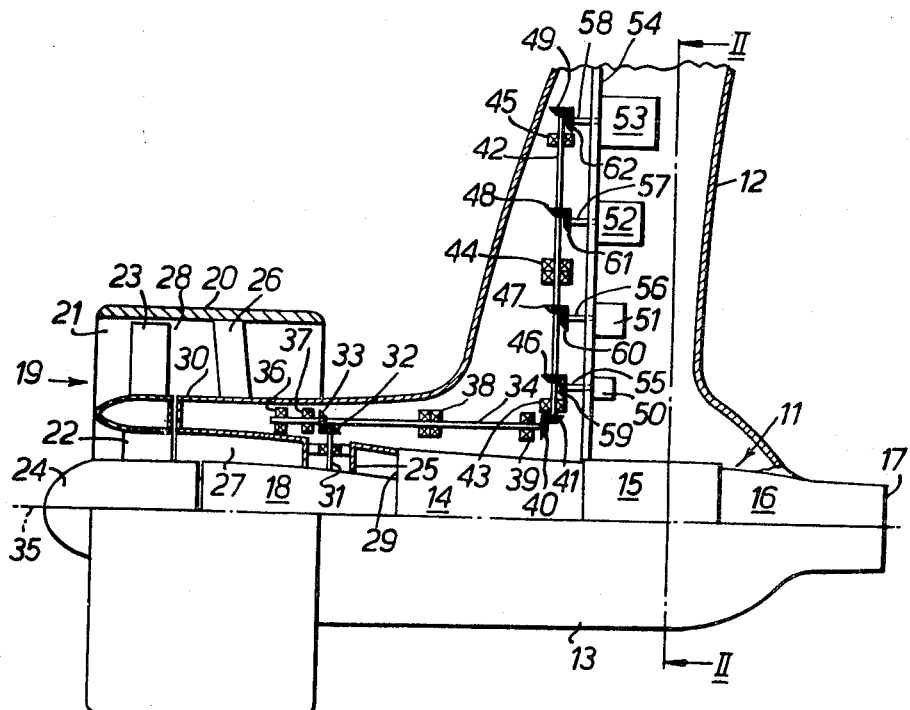
Figure 2:
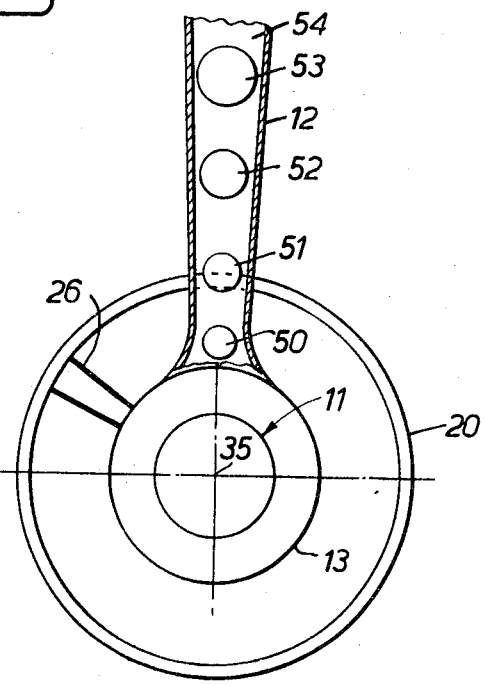

One embodiment of the invention will now be particularly described by way of example with reference to the accompanying diagrammatic drawings, of which, FIG. 1 is a partial cross section of an engine installation incorporating a gas turbine engine of the bypass type, and, FIG. 2 is a cross section taken along the line II—II on FIG. 1.

Referring to the drawings, an aircraft engine installation includes a gas turbine engine 11 of the bypass type which is supported at the lower end portion in the drawing of a hollow strut 12. This strut is suitably attached at its upper end portion in the drawing to the main structure (not shown) of the aircraft wing.

The hollow strut is of streamlined cross-sectional shape and tapers down in transverse width towards the engine, the wall of the strut fairing into an engine pod or nacelle 13 surrounding the engine 11.

The engine includes a compressor 14 of axial flow-type, a combustion section 15, a turbine section 16 and a jet pipe 17. Reduction gearing is provided within a gear casing 18 ahead of the compressor 14 by which the engine drives a bypass fan 19.

The bypass fan is mounted for rotation within a bypass duct 20 and has tiered blading 21. The inner tier 22 of fan blading is of fixed pitch while the outer tier 23 of blading is of variable pitch. Pitch variation of the tier 23 of blading is effected by an hydraulically operable pitch change mechanism (not shown) housed in part within the hub 24 of the fan 19. A gas turbine engine having such tiered blading is disclosed in the specification of Pat. No. 3,468,473.

As shown in the drawing, stator blading 25, 26 is provided respectively in the inner and outer tiered ducts 27 and 28. The duct 27 which leads to the air intake 29 of the compressor 14 is separated from the duct 28 by a casing 30 of annular shape.

The stator blading 25 is hollow and one blade thereof provides an opening for a power takeoff shaft 31 which is taken from the reduction gear train within the gear casing 18. A bevel gear 32 fast with the end portion of the shaft 31 remote from the gear casing 18 meshes with a bevel gear 33 fast with a shaft 34 arranged parallel with the axis 35 of rotation of the fan 19. The shaft 34 is mounted in bearings 36 and 37 suitably located within the interior of the casing 30.

The interior of the casing 30 opens into the interior of the hollow strut 12 and the end portion of the shaft 34 within the hollow strut 12 is supported by bearings 38 and 39 which are themselves suitably located in the structure of the hollow strut. This end portion of the shaft 34 has a bevel gear 40 fast therewith.

The bevel gear 40 meshes with a bevel gear 41 fast with the lower end portion in FIG. 1 of a shaft 42 which passes upwardly within the strut 12 at right angles to the shaft 34. The shaft 42 is mounted in suitable bearings 43, 44 and 45, themselves suitably located within the hollow strut. The shaft 42 has further bevel gears 46, 47, 48 and 49 spaced at intervals and fast thereon.

Conventional engine accessory units 50, 51, 52 and 53 of differing sizes are mounted in physically parallel manner as shown within the interior of the hollow strut 12 and it will be seen from FIG. 2 that the sizes of these units are in ascending order in a direction away from the engine so that they are compactly arranged within the strut and the strut is of the smallest possible transverse width.

The unit 50 is a fuel pump, the unit 51 an oil pump, the unit 52 a tachometer and the unit 53 an alternator. The rearward portion of the wall of the hollow strut 12 is removable to give ready access to these accessory units for servicing.

The units 50, 51, 52 and 53 are mounted upon a backbone member 54 running upwardly through the interior of the hollow strut at right angles to the rotational axis 35. The drive shafts 55, 56, 57 and 58 of the respective accessory units each have respective bevel gears 59, 60, 61 and 62 fast therewith which respectively mesh with the bevel gears 46, 47, 48 and 49.

During operation of the bypass fan engine 11, the shaft 31 taken from the reduction gearing within the gear casing 18 drives the shafts 34 and 42 and thus the accessory units 50, 51, 52 and 53.

In mounting these accessory units within the hollow strut 12 they are disposed an appreciable distance away from the combustion section 15 of the engine 11, and thus are in a relatively cool zone in contrast to accessory units in some installations hitherto which have been grouped immediately adjacent the engine compressor.

Further, by so mounting the accessory units in accordance with the invention, good use is made of the hollow interior of the strut which apart from this normally only houses engine control equipment, fuel pipes, oil pipes and electrical conduits. The accessory units are conveniently of such sizes that the streamlined hollow strut can be relatively slim with a desired amount of uniform taper in the transverse sense in the direction towards the engine.

Although in the embodiment described with reference to the drawings the gearing is of bevel type, in alternative embodiments of the invention the gearing is of straight spur type.

Again, although in the embodiment described with reference to the drawings, the engine is a gas turbine engine of the bypass type having a tiered bypass fan, in other embodiments of the invention the engine may be of similar type but with a nontiered fan, or alternatively again instead of the fan of such a bypass gas turbine engine being mounted ahead of the engine compressor, the fan may be of the aft-mounted type and driven substantially directly from the turbine section of the engine.

Further, in alternative embodiments, the engine may be a gas turbine engine, but of the nonbypass type, while in yet further embodiments the engine may be a piston engine or an engine of the rotary epitrochoidal type and may be arranged to drive a conventional air screw or any other power absorbing device.

Although in the embodiment described with reference to the drawings, the engine is suspended from the hollow strut, in other embodiments the hollow strut may form a plinth upon which the engine is mounted.

Although in the embodiment described with reference to the drawings, the strut is suitably attached at its upper end portion to the main structure of the aircraft wing, in alternative embodiments, the strut is suitably attached to the aircraft fuselage.

The invention however, is in no way limited to application to an aircraft as in other embodiments it may be applicable in other vehicle installations or in fixed installations.

However, where it is applied to aircraft installations, it will be understood that it affords a reduced engine frontal area because the accessory units which hitherto were usually grouped around the engine structure thereby increasing in its overall diameter, are now compactly arranged within the hollow strut.

I claim:

1. An engine installation including a gas turbine engine of the bypass type having a bypass fan, a hollow supporting strut connected to the engine, and at least one accessory unit mounted within the hollow strut and drivable from the engine by power takeoff means which comprises shafting and gearing suitably mounted in bearings, said bypass fan being of tiered form to provide at least two concentric annular flow paths, and part of said shafting and gearing being mounted in structure which in part defines the division between the two flow paths downstream of the tiered fan.

2. An engine installation as claimed in claim 1, the supporting strut of which is adapted for fitment upon an aircraft.

3. An engine installation including an engine, a hollow supporting strut connected to the engine and a plurality of accessory units mounted within the hollow strut and drivable by power takeoff means from the engine, said hollow supporting strut tapering down in a direction towards the engine and said accessory units being of differing sizes and disposed in physically parallel manner within the strut with their sizes in ascending order in a direction away from the engine.

4. An engine installation including a gas turbine engine of the bypass type having a bypass fan mounted for rotation in a bypass duct, a hollow supporting strut connected to the engine and a plurality of accessory units mounted within the hollow strut and drivable by power takeoff means from the engine, said hollow supporting strut tapering down in a direction towards the engine and said accessory units being of differing sizes and disposed in physically parallel manner within the strut with their sizes in ascending order in a direction away from the engine.

5. An engine installation as claimed in claim 4, wherein the bypass fan of said engine is of tiered form to provide at least two concentric annular flow paths.

6. An engine installation including an engine, a hollow supporting strut connected to the engine, and a plurality of accessory units which are mounted individually and directly, in physically parallel manner, upon a backbone member of the strut extending lengthwise through the interior thereof, and which are drivable by power takeoff means from the engine.

7. An engine installation including an engine, a hollow supporting strut connected to the engine, and a plurality of accessory units which are mounted individually and directly, in physically parallel manner, upon a backbone member of the strut which extends lengthwise through the interior thereof, said accessory units being drivable from the engine by power takeoff means which includes shafting, parallel with said backbone member, mounted in bearings within the strut and carrying gearing in mesh with gearing on individual and parallel input shafts of the accessory units.

8. An engine installation including an engine, a hollow supporting strut connected to the engine, and a plurality of accessory units which are mounted individually and directly, in physically parallel manner, upon a backbone member of the strut which extends lengthwise through the interior thereof, said accessory units being drivable from the engine by power takeoff means which includes shafting, parallel with said backbone member, mounted in bearings within the strut and carrying gearing in mesh with gearing on individual and parallel input shafts of the accessory units, said strut tapering down in a direction towards the engine and accommodating accessory units of differing sizes, their sizes being arranged in ascending order in a direction away from the engine.

9. An engine installation as claimed in claim 8, wherein the engine is a gas turbine engine of the bypass type.

* * * * *